(12) United States Patent
Newport

(10) Patent No.: US 7,926,678 B2
(45) Date of Patent: Apr. 19, 2011

(54) FUEL CAP TETHER

(75) Inventor: James B. Newport, Connersville, IN (US)

(73) Assignee: Stant USA Corp., Connersville, IN (US)

(*) Notice: Subject to any disclaimer, the term of this patent is extended or adjusted under 35 U.S.C. 154(b) by 671 days.

(21) Appl. No.: 11/752,111

(22) Filed: May 22, 2007

(65) Prior Publication Data

US 2007/0278231 A1    Dec. 6, 2007

Related U.S. Application Data

(60) Provisional application No. 60/747,862, filed on May 22, 2006.

(51) Int. Cl.
*B65D 55/16* (2006.01)

(52) U.S. Cl. .................................................. 220/375

(58) Field of Classification Search .................. 220/280, 220/279, 265, DIG. 33; 215/306, 200, 254; 296/97.22; D9/446; *B65D 55/16, 55/00*
See application file for complete search history.

(56) References Cited

U.S. PATENT DOCUMENTS

| | | | |
|---|---|---|---|
| 4,320,853 A | 3/1982 | Moore | |
| 4,583,668 A * | 4/1986 | Maynard, Jr. | 222/529 |
| 4,595,130 A * | 6/1986 | Berney | 222/539 |
| 4,705,190 A * | 11/1987 | Mizusawa | 220/375 |
| 4,754,895 A * | 7/1988 | Lardner et al. | 220/288 |
| 5,090,583 A * | 2/1992 | Hoffman et al. | 215/253 |
| 5,150,808 A * | 9/1992 | Hamilton | 220/375 |
| 5,462,190 A | 10/1995 | Lienhart et al. | |
| D404,703 S * | 1/1999 | Glazer | D12/218 |
| 6,550,626 B1 * | 4/2003 | Randall | 215/253 |
| D500,275 S | 12/2004 | Martinez et al. | |
| 7,025,222 B2 | 4/2006 | Hagano et al. | |
| 2003/0173362 A1 * | 9/2003 | Ishida et al. | 220/375 |
| 2007/0045322 A1 * | 3/2007 | Hagano et al. | 220/375 |

* cited by examiner

*Primary Examiner* — Anthony Stashick
*Assistant Examiner* — Robert J Hicks
(74) *Attorney, Agent, or Firm* — Barnes & Thornburg LLP

(57) ABSTRACT

A filler neck closure unit of a vehicle includes a closure cap adapted to close a fuel tank filler neck of the vehicle. Also included is a breakaway tether including a mount ring and a strap. The mount ring is coupled to the cap and formed to include a weakened, frangible section. The strap has a first end coupled to the mount ring and a second end adapted to be anchored to the vehicle which includes the fuel tank filler neck.

14 Claims, 3 Drawing Sheets

FUEL CAP TETHER

This application claims priority under 35 U.S.C. §119(e) to U.S. Provisional Application Ser. No. 60/747,862, filed May 22, 2006, which is expressly incorporated by reference herein.

BACKGROUND

The present disclosure relates to closures for fuel tank filler necks, and particularly to fuel cap tethers. More particularly, the present disclosure relates to tethers for vehicle fuel caps.

SUMMARY

A filler neck closure unit in accordance with the present disclosure includes a filler neck closure cap and a breakaway tether coupled to the cap. In illustrative embodiments, the breakaway tether includes a mount ring coupled to the cap and configured to include a weakened, frangible section.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which.

DETAILED DESCRIPTION

Figure 7:
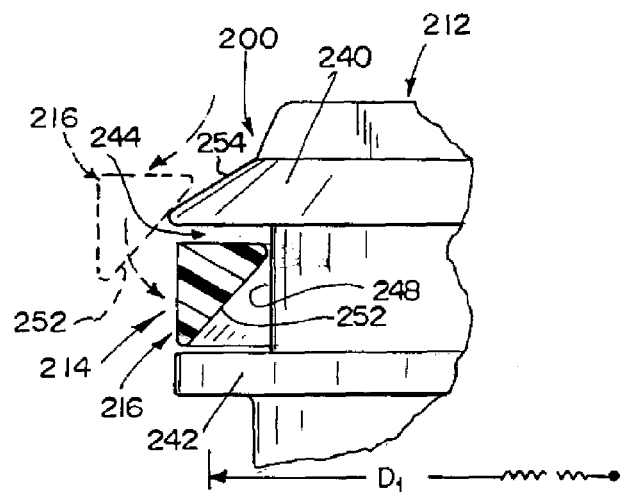
FIG. 7 is a side elevation view of a portion of a filler neck closure unit in accordance with a second embodiment of the present disclosure showing movement of a tether mount ring (shown in section) formed to include a radially inwardly facing frustoconical surface on and over a radially outwardly facing frustoconical ramp provided on an upper annular flange included in a filler neck closure cap to assume an "installed" position (shown in solid) in an annular groove formed in the filler neck closure cap between the upper annular flange and an underlying lower annular flange.
Figure 8:
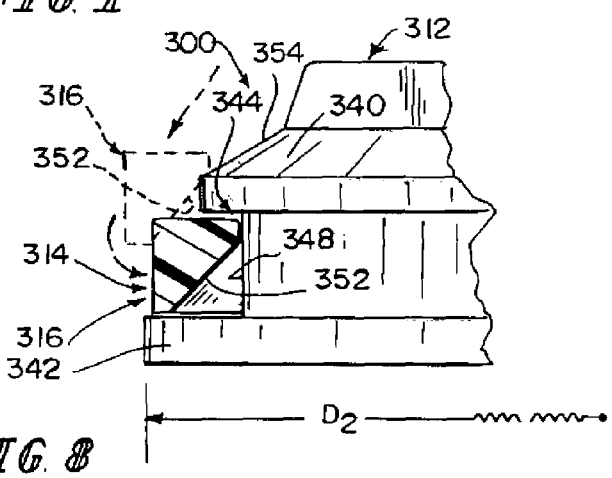
FIG. 8 is a side elevation view of a portion of a filler neck closure unit in accordance with a third embodiment of the present disclosure showing movement of a tether mount ring (shown in section) formed to include a radially inwardly facing frustoconical surface on and over a radially outwardly facing frustoconical ramp provided on an upper annular flange sized to have a first diameter and included in a filler neck closure cap to assume an installed position (shown in solid) in an annular groove formed in the filler neck closure cap between the upper annular flange and an underlying lower annular flange sized to have a greater second diameter.

A filler neck closure unit 10 comprises a cap 12 and a breakaway tether 14 as suggested in FIGS. 1-6. Breakaway tether 14 includes a mount ring 16 coupled to cap 12 and formed to include a weakened, frangible section 18 as suggested in FIGS. 5 and 6. Breakaway tether 14 also includes a strap 20 having a first end 21 coupled to mount ring 16 and a second end 22 anchored to a vehicle 24. As suggested in FIG. 3, mount ring 16 is configured to break in a controlled manner at weakened, frangible section 18 to separate breakaway tether 14 from cap 10 if vehicle 24 is damaged by an external impact force 26 so that tether 14 does not disrupt cap 10 and move cap 10 from a stationary, closed position closing an opening 27 into a passageway 29 formed in a fuel tank filer neck 28. A filler neck closure unit 200 in accordance with a second embodiment of the present disclosure is illustrated in FIG. 7 and a filler neck closure unit 300 in accordance with a third embodiment of the present disclosure is shown in FIG. 8.

Figure 1:
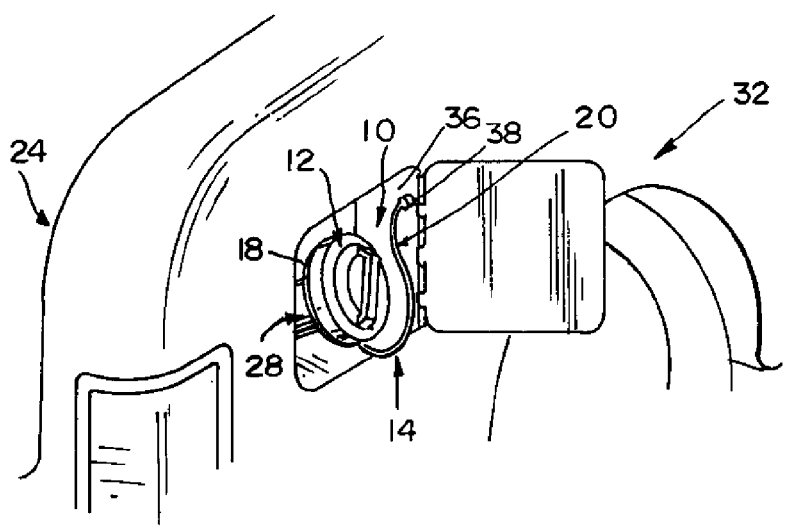
FIG. 1 is a perspective view of a filler neck closure unit in accordance with the present disclosure comprising a filler neck closure cap mounted on a fuel tank filler neck and a breakaway tether coupled to the vehicle at one end and to the filler neck closure cap at the other end.
Figure 2:
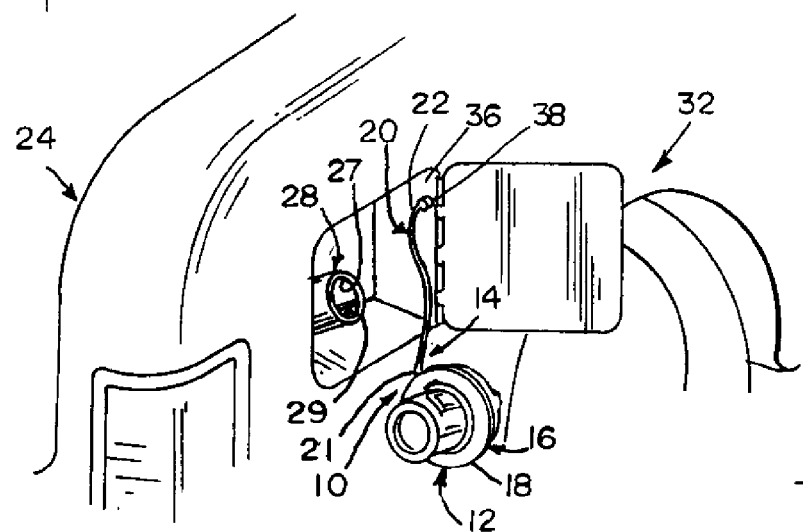
FIG. 2 is a view similar to FIG. 1 showing removal of the filler neck closure cap to expose a mouth opening into a fuel-dispensing pump nozzle-receiving passageway formed in the fuel tank filler neck and use of the breakaway tether to limit movement of the filler neck closure away from the filler neck.

As shown, for example, in FIG. 1, an outer end of fuel tank filler neck 28 is located in a cavity 30 formed in a vehicle 24. A filler neck access door 32 is mounted for movement relative to a vehicle body panel 34 to expose and hide fuel tank filler neck 28. In the illustrated embodiment, second end 22 of strap 20 of breakaway tether 14 is coupled to a side wall 36 included in vehicle 24 to provide a border for cavity 30 by means of a fastener 38.

Figure 4:
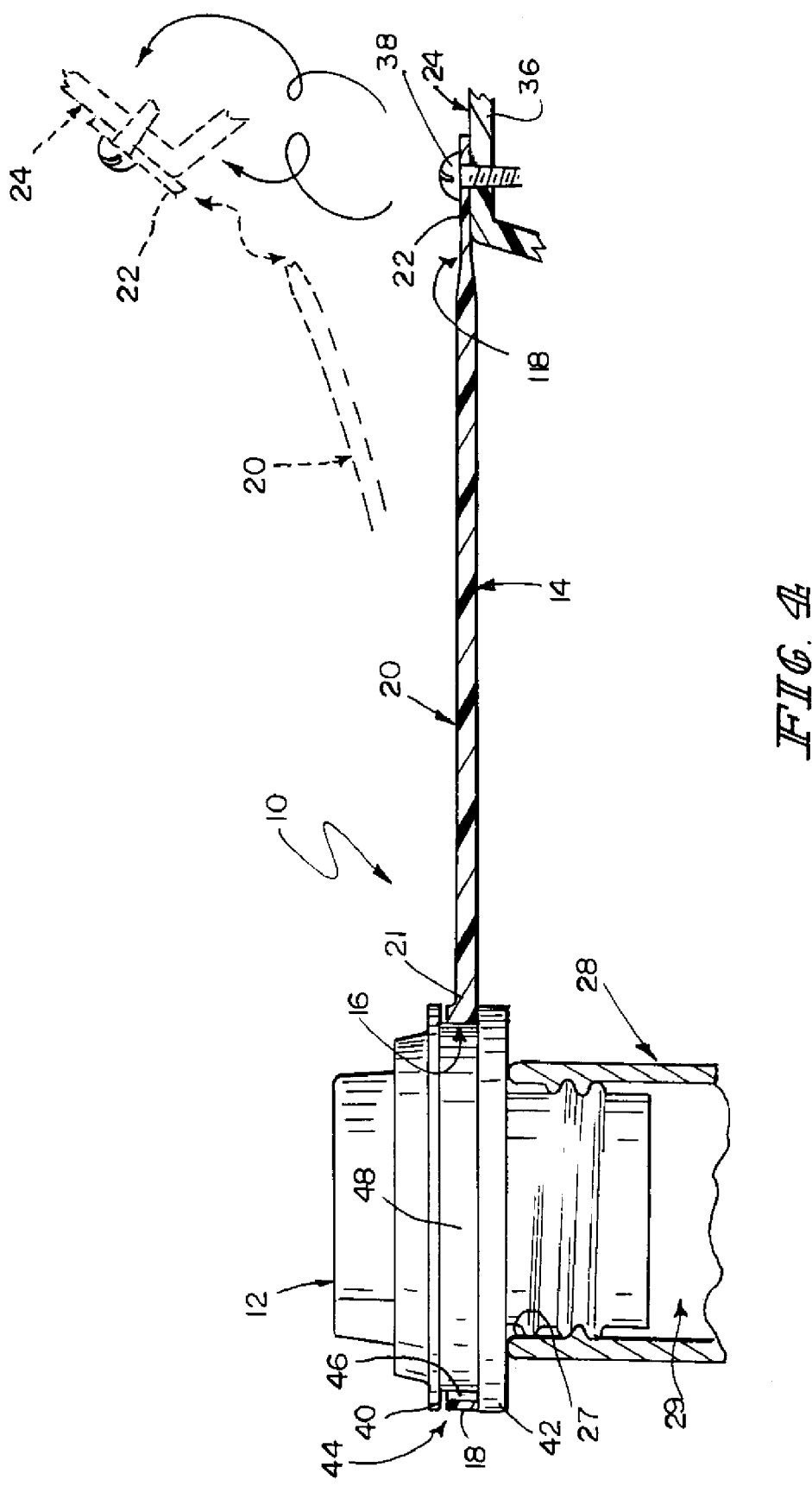
FIG. 4 is an enlarged view of a filler neck closure unit, in accordance with a first embodiment of the present disclosure, comprising a filler neck closure cap and a breakaway tether showing a first weakened, frangible section provided in a mount ring included in the breakaway tether and a strap having a left end coupled to the mount ring and a right end formed to include a second weakened, frangible section and anchored to the vehicle by means of a fastener.
Figure 5:
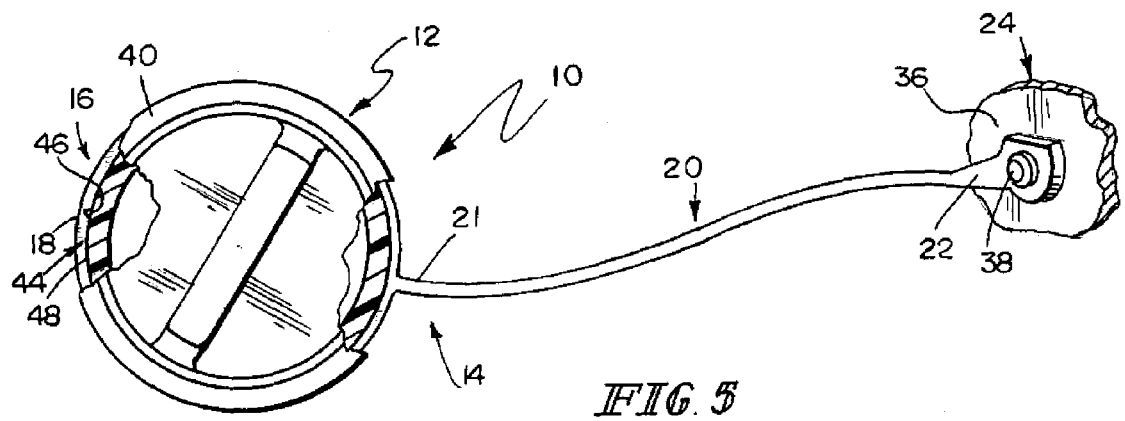
FIG. 5 is a plan view of the filler neck closure cap of FIG. 4, with portions broken away, showing formation of the mount ring to include a radially inwardly opening notch bordering the weakened, frangible section in the mount ring.

As suggested in FIG. 4, cap 12 includes an upper annular flange 40 arranged to cooperate with a lower annular flange 42 to form a radially outwardly opening groove 44 receiving mount ring 16 therein so as to couple breakaway tether 14 to cap 12. Mount ring 16 is made of an elastic material and is formed to include a radially inwardly opening notch 46 facing toward an annular rear wall 48 of groove 44 as suggested in FIGS. 4 and 5.

Figure 3:
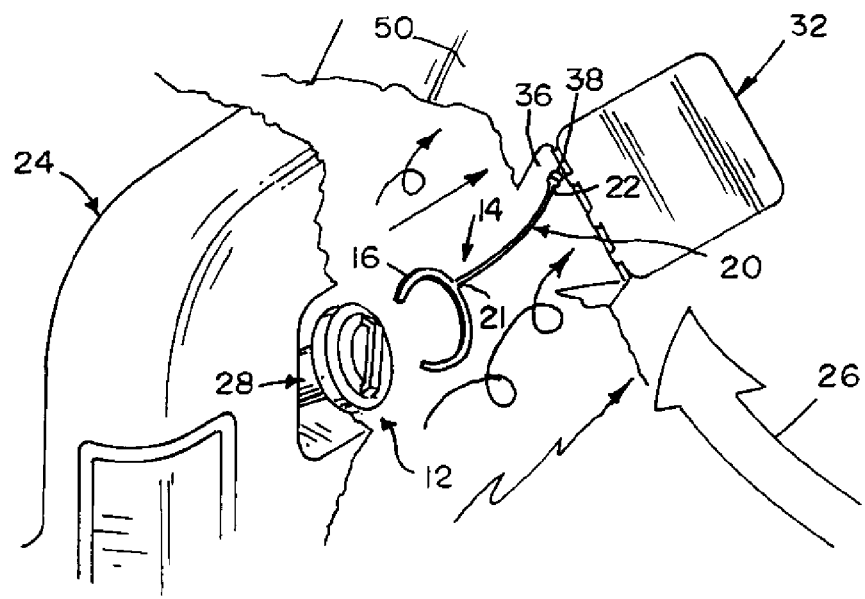
FIG. 3 is a view similar to FIGS. 1 and 2 showing damage to the vehicle caused by an external impact force applied to the vehicle causing fracture of the breakaway tether in a predetermined controlled manner and separation of the breakaway tether from the filler neck closure to allow the filler neck closure to remain in an undisrupted stationary, closed position on the filler neck after application of the illustrated external impact force to the vehicle.
Figure 6:
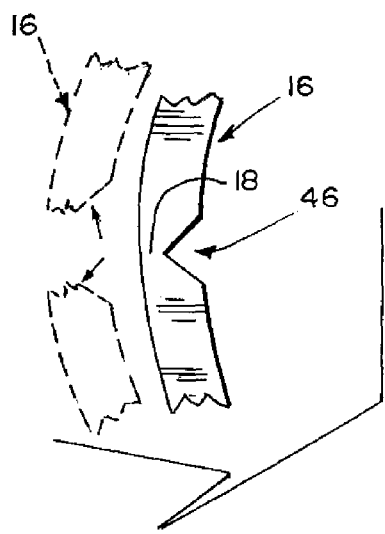
FIG. 6 is an enlarged view of a breakaway portion of the mount ring shown in FIG. 5, showing, in solid, an "unbroken" weakened, frangible section associated with the radially inwardly opening notch and also showing, in phantom, that breakaway portion of the mount ring after its weakened, frangible section has been "broken" in a controlled manner.

Should an external impact force 26 be applied to a portion 50 of vehicle 26 coupled to second end 22 of tether strap 20 to cause that vehicle portion 50 to move relative to fuel tank filler neck 28, as suggested in FIG. 3, then mount ring 16 of tether 14 will break in a controlled, predetermined manner as suggested in FIGS. 3 and 6 to disconnect mount ring 16 of breakaway tether 14 from cap 12. Thus, tether 14 is separated from cap 12 mounted on fuel tank filler neck 20 and is unable to disrupt the position of cap 12 relative to fuel tank filler neck 28 substantially.

As suggested in FIG. 7, filler neck closure unit 200 comprises a cap 212 and a breakaway tether 214 including an elastic mount ring 216. Cap 212 includes an upper annular flange 240 and a lower annular flange 242 that cooperate with an annular rear wall 248 to form a radially outwardly opening groove 244 receiving elastic mount ring 216 therein.

Mount ring 216 is formed to include a radially inwardly and axially downwardly facing frustoconical surface 252 as shown in FIG. 7. Upper annular flange 240 is formed to include a radially outwardly and axially upwardly facing frustoconical ramp 254. Surface 252 rides on and over ramp 254 to stretch and otherwise expand the elastic mount ring 216 so that it moves into groove 244 and is then restored to its unstretched and unexpanded shape in the manner suggested in FIG. 7 without breaking or fracturing a weakened, frangible section (like section 18) included in mount ring 216. Ramp 254 functions to pilot or guide mount ring 216 into groove 244 during installation of breakaway tether 214 on cap 212. In the illustrated embodiment, the outer diameters of upper and lower annular flanges 240, 242 are about equal.

As suggested in FIG. 8, filler neck closure unit 300 comprises a cap 312 and a breakaway tether 314 including an elastic mount ring 316. Cap 312 includes an upper annular flange 340 having a first outer diameter D1 and a lower annular flange 342 having a second outer diameter D2 that is greater than first outer diameter D1. Upper and lower annular flanges 340, 342 cooperate with an annular rear wall 348 to form a radially outwardly opening groove 244 receiving elastic mount ring 316 therein.

Mount ring 316 is formed to include a radially inwardly and axially downwardly facing frustoconical surface 352 as shown in FIG. 8. Upper annular flange 340 is formed to include a radially outwardly and axially upwardly facing frustoconical ramp 354. Surface 252 rides on and over ramp 354 to stretch and otherwise expand the elastic mount ring 316 so that it moves into groove 344 and is then restored to its unstretched and unexpanded shape in the manner suggested in FIG. 8 without breaking or fracturing a weakened, frangible section (like section 18) included in mount ring 316. Ramp 354 functions to pilot or guide mount ring 316 into groove 344 during installation of breakaway tether 214 on cap 212.

As suggested in FIG. 4, it is within the scope of the present disclosure to provide a second weakened, frangible section 118 in tether strap 20 near, for example, second end 22 of strap 20. Weakened, frangible section 118 is configured to break in a predetermined, controlled manner as suggested in phantom in FIG. 4 in response to application of an external impact force 26 to vehicle portion 50.

I claim:
1. A filler neck closure unit of a vehicle comprises
a cap adapted to close a fuel tank filler neck of the vehicle,
a breakaway tether including a mount ring and a strap, wherein the mount ring is coupled to the cap and formed to include a weakened, frangible section and the strap has a first end coupled to the mount ring and a second end adapted to be anchored to the vehicle including the fuel tank filler neck, and
wherein the breakaway tether, when anchored to the vehicle, is configured to completely separate from the cap when the vehicle is damaged by an external impact force so that the cap is not moved from a stationary, closed position closing the fuel tank filler neck.

2. The filler neck closure unit of claim 1, wherein the first end of the strap is appended to the mount ring at a first point on the mount ring, the weakened, frangible section of the mount ring is located at a second point on the mount ring, and the mount ring has a diameter intersecting the first and second points to cause the first end of the strap and the weakened, frangible section to lie in diametrically opposed relation to one another on the mount ring.

3. The filler neck closure unit of claim 2, wherein the mount ring is formed to include a radially inwardly opening notch establishing a boundary edge of the weakened, frangible section.

4. The filler neck closure unit of claim 3, wherein the mount ring includes a first straight edge and a second straight edge and the first and second straight edges intersect at the second point on the mount ring and cooperate to define the radially inwardly opening notch therebetween.

5. The filler neck closure unit of claim 3, wherein the mount ring includes a first edge and a second edge and the first and second edges cooperate to define the radially inwardly opening notch therebetween.

6. The filler neck closure unit of claim 1, wherein the mount ring has a first thickness, the first end of the strap has a second thickness, and the first thickness is greater than the second thickness.

7. The filler neck closure unit of claim 6, wherein the mount ring is formed to include a radially inwardly opening notch establishing a boundary edge of the weakened, frangible section, the mount ring includes a radially inwardly facing annular inner surface interrupted by the radially inwardly opening notch and a radially outwardly facing annular outer surface surrounding the radially inwardly facing annular inner surface and defining a ring width between the annular inner and outer surfaces, and the ring width is less than the first thickness.

8. The filler neck closure unit of claim 7, wherein the ring width is less than the second thickness.

9. The filler neck closure unit of claim 1, wherein the cap includes a lower flange and an upper flange arranged to cooperate with the lower flange to form a radially outwardly opening groove receiving the mount ring therein so as to couple the breakaway tether to the cap, the cap also includes a rear wall lying between the lower and upper flanges and cooperating with the lower and upper flanges to form the radially outwardly opening groove, and the radially inwardly opening notch formed in the mount ring faces toward the rear wall of the cap.

10. The filler neck closure unit of claim 7, wherein each of the lower flange, upper flange, and rear wall of the cap has an annular shape.

11. The filler neck closure unit of claim 9, wherein the mount ring is formed to include a radially inwardly opening notch establishing a boundary edge of the weakened, frangible section, the mount ring is made of an elastic material and is formed to include a radially inwardly and axially downwardly facing frustoconical surface interrupted by the radially inwardly opening notch, and the upper flange includes a radially outwardly and axially upwardly facing ramp configured to provide means for guiding the mount ring into the radially outwardly opening groove by expanding the mount ring from an unexpanded shape to an expanded shape without fracturing the weakened, frangible section included in the mount ring during movement of the mount ring on the radially outwardly and axially upwardly facing ramp and into the radially outwardly opening groove to couple the breakaway tether to the cap so that the mount ring is restored to the unexpanded shape and unbroken upon admittance to the radially outwardly opening groove.

12. The filler neck closure unit of claim 11, wherein the lower and upper flanges have annular shapes, the lower flange has an outer diameter, and the upper flange has an outer diameter that is almost equal to the outer diameter of the lower flange.

13. The filler neck closure unit of claim 12, wherein the upper flange has a frustoconical cross-sectional shape.

14. The filler neck closure unit of claim 11, wherein the lower and upper flanges have annular shapes, the upper flange has a first outer diameter, and the lower flange has a second outer diameter that is greater than the first outer diameter.

* * * * *